Sept. 15, 1931.  R. M. RUCK  1,823,766
GEAR CHANGING APPARATUS
Filed March 19, 1930   5 Sheets-Sheet 2
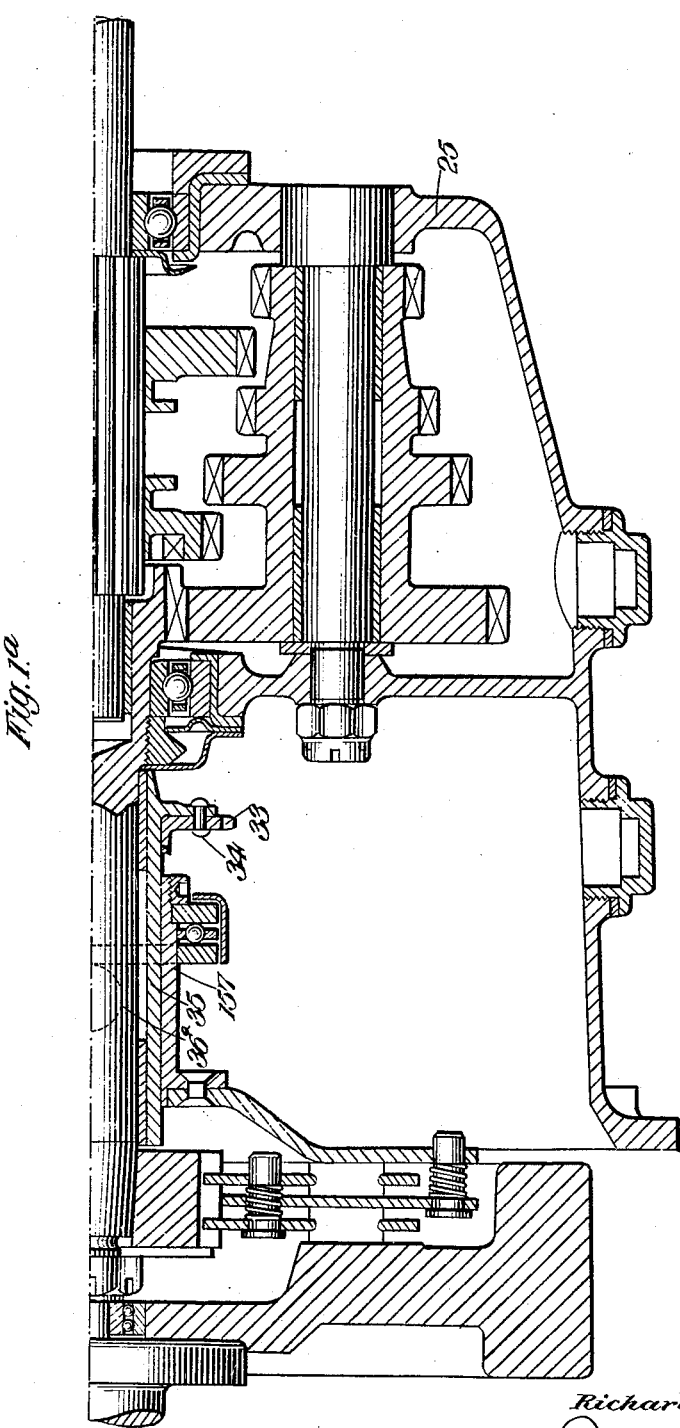
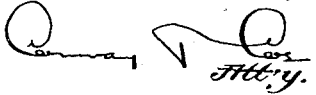

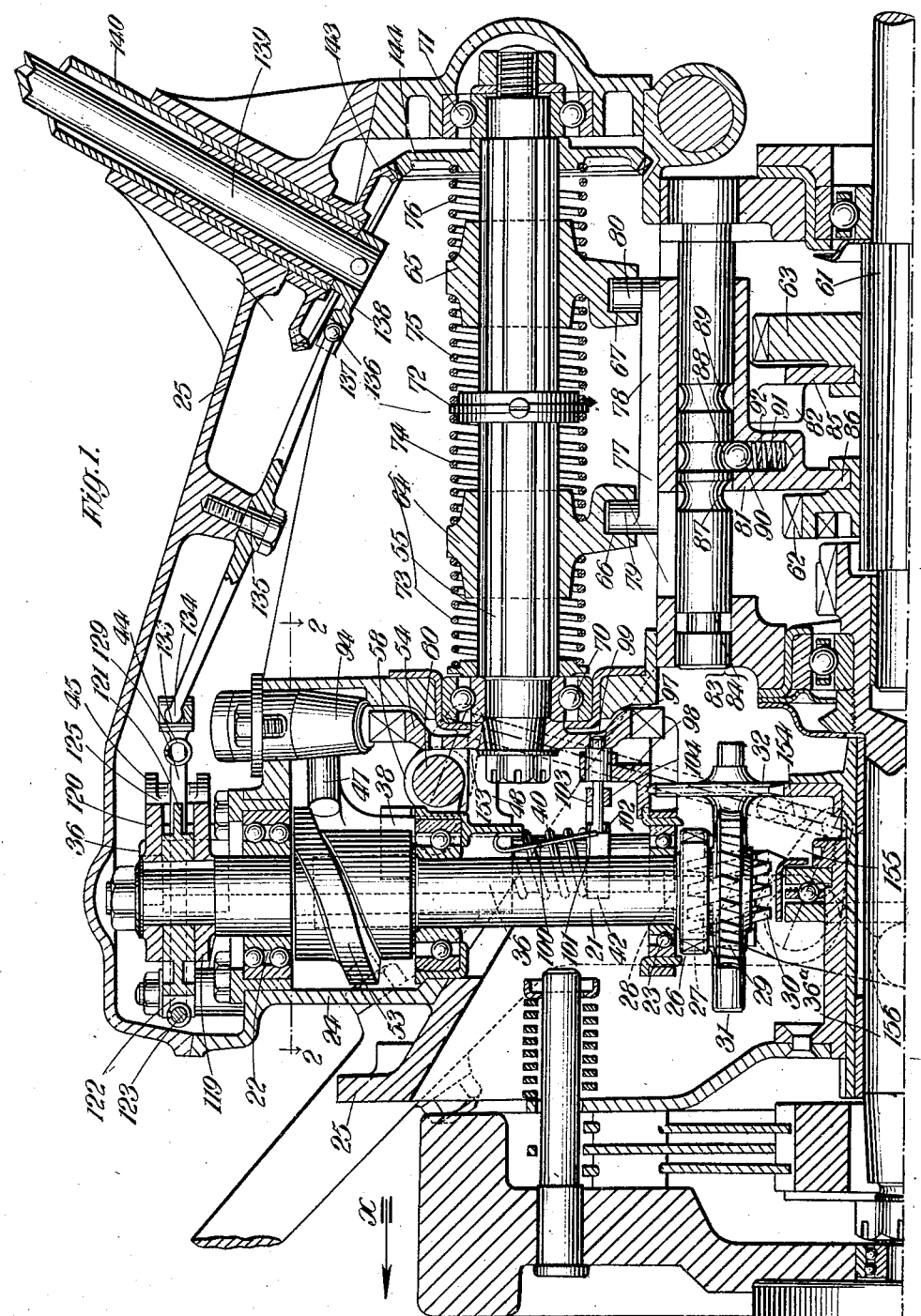

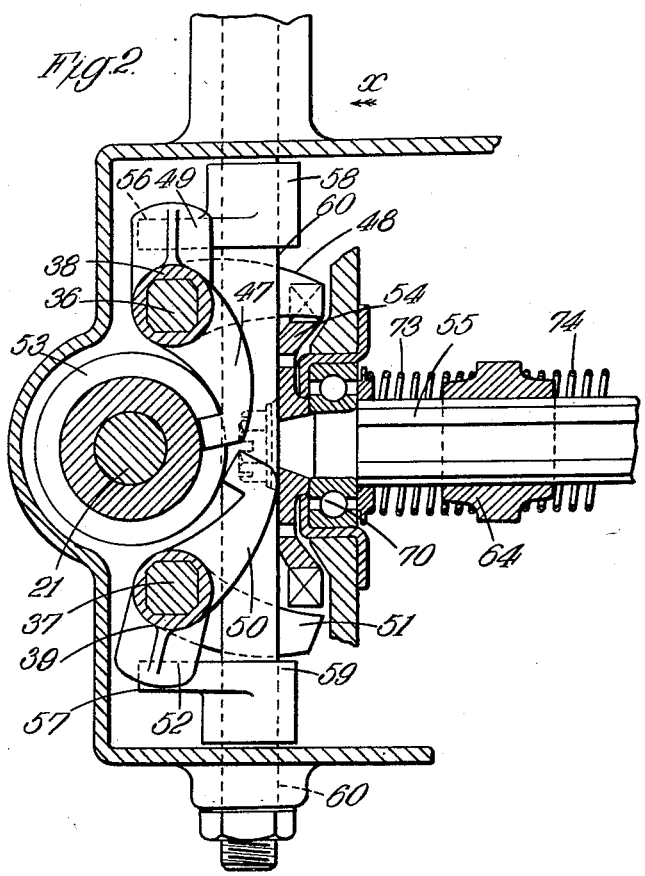
Fig. 2.
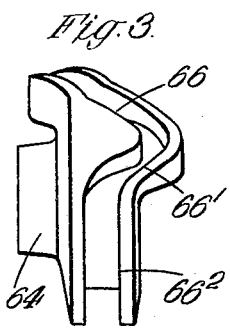
Fig. 3.
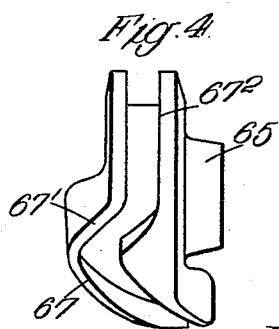
Fig. 4.
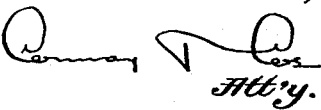

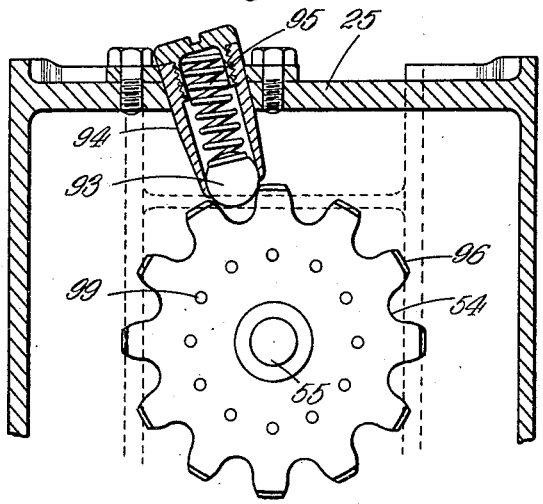
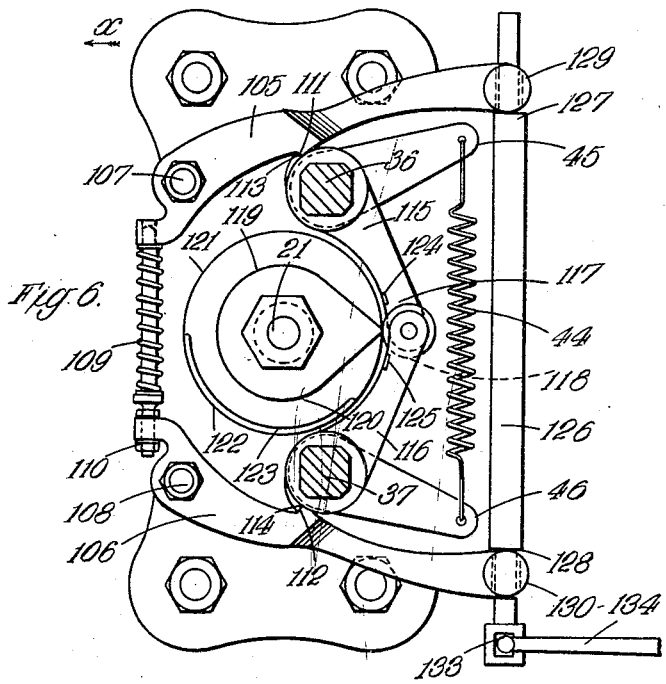

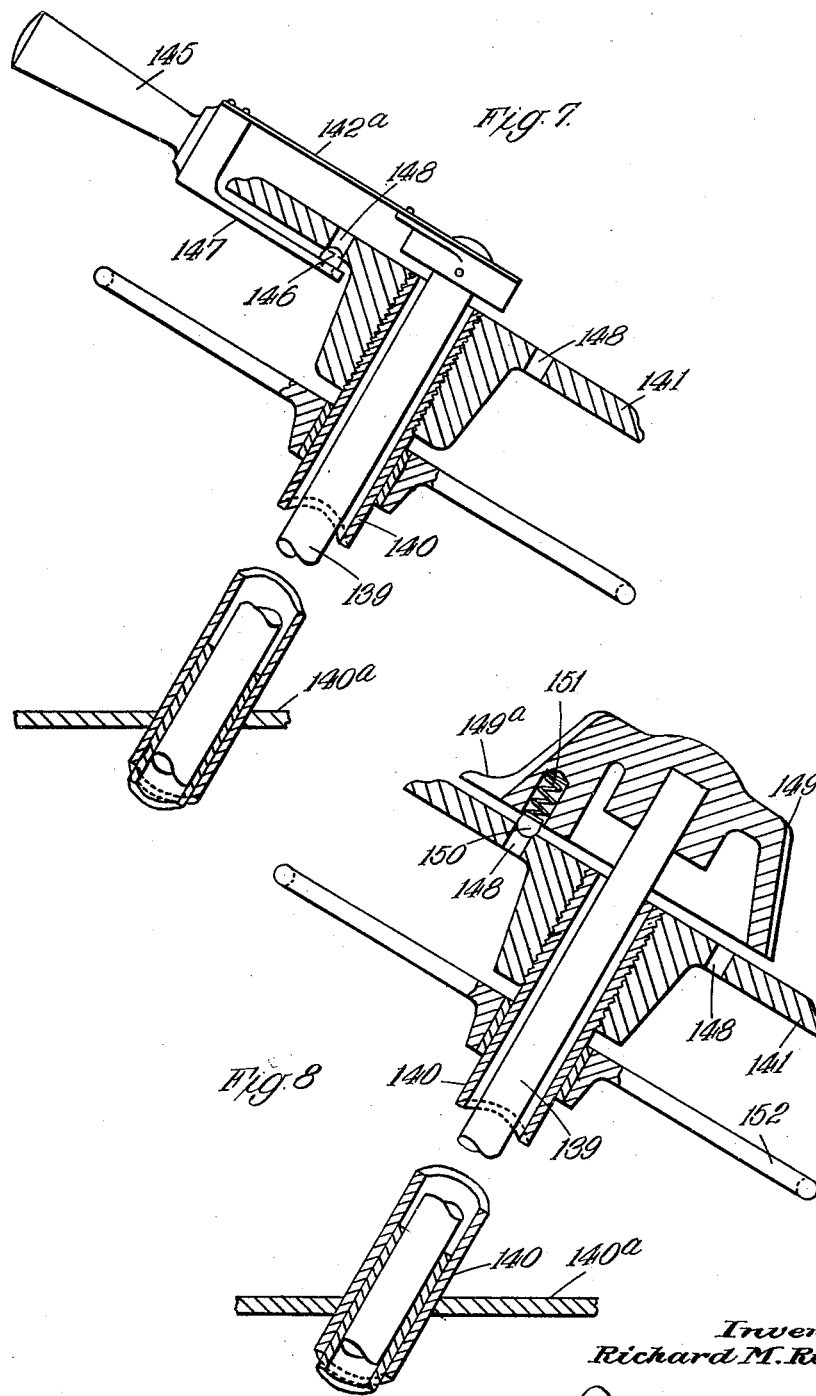

Patented Sept. 15, 1931

1,823,766

UNITED STATES PATENT OFFICE

RICHARD MATTHEWS RUCK, OF LEAMINGTON, ENGLAND

GEAR CHANGING APPARATUS

Application filed March 19, 1930, Serial No. 437,189, and in Great Britain March 25, 1929.

This invention relates to manually-controllable automatically-acting, power operated, step-by-step gear-changing apparatus of the general type referred to in the specification of Letters Patent No. 1,640,808, and it has for its primary object to provide an improved and more compact construction such that, with the exception of the hand-lever or levers or equivalent devices for manually initiating or effecting a change of gear, all the parts may be placed inside the gearbox which latter will require only slight enlargement as compared with the gear-boxes at present employed with any of the well-known type of change speed mechanism.

In order to avoid needless repetition, it will suffice here to state that the more essential parts of the automatic mechanism described in the specification above mentioned are retained in the improved construction of the present invention, the more important of these parts including what were therein referred to by the following terms, namely:—

1. A continuously-driven cam-shaft;
2. A pair of rocking-shafts extending parallel to and equidistant from said cam-shaft;
3. A pair of "pawl-levers" splined upon the respective rocking-shafts and adapted to be slidden along said shafts by cam action;
4. Spring means tending to turn the rocking shafts from their normal or inoperative angular position, and to retain the pawl-levers in their normal or inoperative positions lengthwise of the rocking shafts;
5. A pair of "timing-levers" fast on the respective rocking shafts;
6. A pair of "locking-levers" normally spring-held in position to engage the timing-levers so as to prevent the rocking-shafts turning under the influence of their springs;
7. A "timing-cam" fast on the cam-shaft, for determining the moment at which each rocking-shaft may turn in either direction; and
8. A pair of "locking cams" fast on the cam-shaft for returning to normal angular position whichever timing-lever and rocking-shaft has been unlocked and released therefrom on the manual initiation of an automatic change of gear.

In place, however, of the pair of "main" cams fast on the cam shaft as in the said prior Letters Patent, only one "main" cam is required as both the "pawl-levers" in the present case, move in the same direction.

According to the present invention, the changes of gear are effected by means of a cylindrical cam, hereinafter termed the "Selector-cam" (or cams) rotatable about its axis which extends parallel to that of the shaft (or shafts) whereon are mounted the displaceable elements (e. g. clutch-members, slidable pinions, or the like) of the several transmission trains or groups comprised in the gear-changing apparatus; the selector-cam (or cams) being engaged by a series of arms, one for each such displaceable element, on as many slides, each of which has also an arm engaging one of the displaceable elements. By this arrangement the employment of external selector-bars is dispensed with, and great compactness of construction is ensured.

In addition, the "main slide", which in previous arrangements (as in the specification of Letters Patent No. 1,640,808) formed an important feature of the mechanism, is entirely omitted and the sliding movements imparted to the respective pawl-levers by the main cam are caused to impart step-by-step rotary movement in the one or the other direction to a star-wheel fast on the shaft which carries the selector-cam (or cams) an arrangement by which still further simplification and compactness are attained.

One form of the invention will now be described by way of example, with reference to the accompanying drawings in which Figure 1 is a sectional elevation taken through the axis of a gear box in which the apparatus of the present invention is incorporated, Figure 2 is a fragmentary sectional plan taken on the line 2—2 of Figure 1; Figures 3 and 4 are perspective views of two selector-cams, Figure 5 is a fragmentary sectional elevation of a detail showing the star-wheel locking means, Figure 6 is a plan view of the mechanism controlling the actuation of the pawl-levers, Figure 7 is a sectional elevation of the manual control means and Figure 8 is a modification of Figure 7.

The arrow marked x, wherever it appears, indicates the forward direction of running of the vehicle.

The cam-shaft 21, extends vertically through and is journalled in ball bearings 22, 23 mounted on the casing 24 formed integrally with the normal gear box casing 25 of the vehicle, and is driven continuously by a spur-wheel 26 formed on the lower end thereof meshing with a spur-wheel 27 running on an auxiliary shaft 28 extending parallel to the cam-shaft 21, said spur-wheel being formed integrally with a toothed wheel 29 adapted to engage a worm-wheel 30 carried on a short shaft 31 extending transversely of the cam-shaft 21, said shaft 31 also carrying a sprocket wheel 32 connected by a sprocket-chain (not shown) with a second sprocket-wheel 33 riveted as at 34 to a sleeve 35 surrounding the clutch shaft 36a and rotating continuously with the engine shaft.

Extending parallel to, and equidistant from, but not in the same plane as, the cam shaft 21 are two rocking-shafts 36, 37, the one 36 to the right and the other 37 to the left with respect to the forward direction of running of the vehicle, and extending through the casing 24 being journalled in bearings (not shown) secured thereto. Both the rocking-shafts 36, 37 are arranged to rotate through a small angle in said bearings; splined upon the respective rocking-shafts 36, 37 are the hubs 38, 39 of a pair of pawl levers, each formed with three arms for a purpose to be hereinafter set forth. Each pawl lever is normally held in its inoperative position i. e. in which none of its arms is in use, and against the upper part of the casing 24 by means of a thrust-spring 40, 41 coiled about the corresponding rocking shafts 36, 37 and abutting at their lower ends against a collar 42, 43 secured to the rocking-shafts, which collars have an additional function to be hereinafter described, whilst the rocking shafts, 36, 37 tend constantly to assume their operative angular positions under the stress of a spring 44 stretched between a pair of arms 45, 46 fast on the respective shafts 36, 37 and outside the casing 24. The thrust-springs 40, 41 coiled on the rocking-shafts 36, 37 may be replaced by an external tension spring (not shown) attached to the end of the chain lever 153 and suitably anchored to the gear-box casing so that the clutch-shaft 60 maintains the pawl-levers 47, 48, 49 and 50, 51, 52 against the upper part of the casing 24 by means of the levers 56 and 57.

Either of the pawl-levers 47, 48, 49 or 50, 51, 52 (these references being used for the three arms above mentioned) is capable of being brought, by angular displacement of its rocking shaft 36 or 37 into a position to permit the one arm 47 or 50 to engage the one face of a main face cam 53, splined on the cam-shaft 21, the second arm 48 or 51 to engage between two adjacent teeth of a star-wheel 54 fast on a shaft 55 and the third arm 49 or 52 to engage with an arm 56 or 57 formed on a hub 58 or 59 splined on the clutch control shaft 60.

The shaft 55 extends parallel to the countershaft 61 within the gear box, whereon is mounted the displaceable elements, i. e. the slidable pinions 62, 63 of the transmission train or group comprised in the gear-changing apparatus.

Rotation of the main cam 53 effects the displacement of that pawl-lever, which has been rocked, in a direction corresponding with the inclination of the cam, to the extent of one step lengthwise of its rocking-shaft 36 or 37, such displacement communicating a rotational movement, due to the engagement of the arm 48 or 51, between adjacent teeth of the star-wheel 54, to said star-wheel, equivalent to the pitch of the teeth thereon.

The axis of the star-wheel shaft 55 extends horizontally at right angles to, and intersects that of, the cam-shaft 21, midway between the rocking-shafts 36, 37, so that the star-wheel 54 is presented symmetrically between the two pawl-levers 47, 48, 49 and 50, 51, 52.

Mounted slidably on the star-wheel shaft 55, but rotatable therewith are two cylindrical cams 64, 65 (hereinafter referred to as selector-cams) the periphery of each of which is formed with a cam-groove 66 and 67. In the example shown only two such cams are illustrated, but it will be understood that, if there be more than two displaceable pinions such as 62, 63, then the number of selector-cams will be increased correspondingly.

The star-wheel shaft 55 is journalled in bearings 70, 71 mounted towards the front of, and at the rear end of the gear box casing, and has mounted thereon a fixed collar 72 intermediately of its length; each selector-cam 64, 65 is held in a normal midway position between the bearings 70, 71 and the collar 72 by means of a pair of buffer-springs 73, 74 and 75, 76; engaging the selector-cam 64, 65 axially from opposite sides, so that, whilst the selector-cams are forced to rotate with the star-wheel shaft 55 they are permitted a limited movement parallel to its axis. This spring loading of the selector-cams is necessary to provide a "lost motion" interval between the beginning of the movement imparted to the gear-changing slide (described hereinafter) and the shooting into gear of that pinion (e. g. 62 or 63) which is to be shifted (such "lost motion" being necessary in the event momentary failure in registration of gear teeth with tooth intervals in the corresponding transmission train).

Each cam-groove 66, 67 formed in the selector-cams 64, 65 has an oblique or active portion 66', 67', and a straight circumferential or idle portion $66^2$, $67^2$ (see Figures 3 and 4) these portions being so disposed around the axis of the cams, in the case of the respective grooves, that the oblique or active portions 66', 67' of only one cam groove at a time can come into operation to shift the corresponding pinion 62, 63 of the gear changing apparatus, the remaining pinion being, meanwhile, held against sliding movement by the straight circumferential or idle portions $66^2$, $67^2$ of the corresponding cam-groove.

In order to shift the slidable pinions 62, 63 there are provided "selector-operators" 77, 78 formed with arms 79, 80 adapted to engage permanently the cam grooves in the selector-cams 64, 65 said selector-operators 77, 78 being screwed to the "selectors" 81, 82 slidably mounted on gear-changing slides 83, 84, whilst the selectors 81, 82 are formed with arms (or preferably forked arms) 85, 86 permanently engaging a groove in the slidable pinions 62, 63. The gear changing slides 83, 84 are fixed to the gear-box casing and are formed along their length with a series of circumferential depressions such as 87, 88, 89 for the purpose of permitting a spring-pressed ball 90 carried in a recess 91 (which also retains the spring 92) formed in the selector 81, 82, to engage said depressions thereby acting as a lock or safety-catch or the selector to prevent actuation of the slidable pinions 62, 63 if the selector-cams 64, 65 be not operated.

In the drawings, only two slidable pinions are shown, this being the arrangement which can be adapted very readily for use with gear-boxes known as the "three-speed type" and it will be understood that, if more speeds be required, the addition of further pinions (and consequently selector-cams) will be sufficient without alteration to the other parts of the apparatus.

It will be understood that the main cam 53 is adapted to slide the one or the other pawl-lever 47, 48, 49 or 50, 51, 52, whichever has been angularly displaced by rotation of its rocking-shaft 36 or 37 along said shaft, each through a predetermined distance during part of one revolution of the cam-shaft 21 and, during the remainder of such revolution, to permit the pawl-lever 47, 48, 49 or 50, 51, 52, to return to its normal position by a combined sliding and angular movement. Consequently as the respective pawl-levers are adapted to engage between adjacent teeth of the star wheel 54 from opposite sides, the operative sliding movement of the one pawl-lever imparts a step-by-step rotary movement to the star-wheel and hence to the selector-cams 64, 65, in one direction only, the other pawl-lever being adapted to impart a similar movement to the selector-cams, but in the contrary direction. A neutral position is provided between each two successive active positions of the gear-changing apparatus, and, by bringing into operation the one or the other pawl-lever, all available changes of gear upwards or downwards may be run through step-by-step, two complete steps (e. g. from first gear to neutral and thence either to second gear or reverse gear, at will) being required between any one active position and the next succeeding active position of the gear-changing apparatus. At the conclusion of each step all parts return automatically to normal position.

In order to lock the star-wheel 54 and hence the selector-cams 64, 65 against accidental angular movement a jumper in the form of a ball 93 is carried in a cylindrical casing 94 bolted to the gear-box casing, the ball 93 being pressed outwardly from said cylinder, by a coiled spring 95, to engage between adjacent teeth of the star-wheel, the edges of the star-wheel teeth being chamfered as at 96 to permit the ball 93 to slide thereover when a change in gear either upward or downward, is effected, (see Figure 5). A further lock for the star-wheel and hence the selector-cams is provided to prevent, positively, any actuation thereof if an automatic change of gear be not initiated, this lock being dependent on the angular displacement of the rocking-shafts 36, 37. A spring-pressed pin 97, carried in a bracket 98, is adapted to engage one of a series of holes 99 formed in the face of the star-wheel 54 being maintained in such engagement by a strong leaf spring 100 secured at one end to the casing of the gear box. The rear end of the pin 97 is formed with two shoulders 101, 102 against which are adapted to bear from opposite sides the ends of two arms 103, 104 each formed integrally with the collars 42, 43 splined on the rocking-shafts 36, 37 and serving as abutments for the thrust-springs 40, 41. It will be clear that when the one or the other rocking shaft 36 or 37 is angularly displaced on the initiation of an automatic change in gear, the collar 42 or 43 and the arm 103 or 104 will be rocked so that the end of the arm 103 or 104 bears against the shoulder 101 or 102 and forces the pin 97, against the thrust of the spring 100, out of engagement with the one hole of the series 99 with which it is in engagement, thereby allowing the star-wheel 54 and the selector-cams 64, 65 to be free to rotate, apart from the restraining influence of the spring-pressed ball 93, under the sliding action of the one or the other pawl lever 47, 48, 49 or 50, 51, 52.

Manual initiation of an automatically produced step in a change of gear may be effected by means somewhat similar to those described in the specification of my prior Letters Patent No. 1,640,808, but with modifications necessitated by the improved arrangements of the present invention.

As before, the rocking shafts are normally retained in their inoperative angular positions by means of a pair of "locking-levers" 105, 106 fulcrumed at 107, 108 outside the casing 24 beyond the bearing 22 of the cam-shaft 21 (see Figure 6); the lower arms of these levers are forced apart by a thrust-spring 109 adjustable at 110, so as to cause ribs 111, 112 on the levers 105, 106 to engage notches 113, 114, on the hubs of a pair of "timing-levers" 115, 116 which are fast on the adjacent ends of the respective rocking shafts 36, 37. The timing levers 115, 116 extend from their respective rocking-shafts towards one another in parallel planes and carry on normally coincident axes parallel with the axis of the cam-shaft 21, anti-friction rollers 117, 118 each of which is adapted, when the corresponding timing-lever 115 or 116 is released by its locking-lever 105 or 106 to move under the action of the spring 44. This spring 44, when thus permitted to act, causes the rocking-shaft 36 or 37 to turn so as, on the one hand, to bring (a) the arm 47 or 50 of the pawl-lever into engagement with the main-cam 53, (b) the arm 48 or 51 to engage between adjacent-teeth of the star-wheel 54 (c) the arm 49 or 52 to engage with the arm 56 or 57 on the hubs 58 or 59 mounted on the clutch-control shaft 60 and (d) to rock the collar 42 or 43 thereby causing the arm 103 or 104 to withdraw the pin 97 from engagement with one of the series of holes 99 in the star-wheel 54 and, on the other hand, to bring the anti-friction roller 117 or 118 into engagement with the edge of a "locking-cam" 119 or 120 whereby at the proper moment, the timing-lever 115 or 116, whichever has been depressed, is raised again to its normal position so as to restore to its normal or inoperative angular position the particular rocking-shaft 36 or 37 which has been allowed to turn and thus to reset all the co-acting parts to normal position.

The locking-cams 119, 120 which are of similar shape and angularly coincident are fast, side-by-side, on the camshaft 21, outside the bearing 22 and between them there is also fast upon the same shaft a "timing-cam" 121 consisting of a disc from the opposite faces of which, throughout rather less than one half the circumference, project a pair of similar and angularly coincident "timing-flanges" 122, 123. From those faces of the timing-levers 115, 116 which are adjacent to the timing-cam 121, project studs 124, 125 each of which, so long as its timing lever occupies its normal or inoperative angular position, remains outside the path of the corresponding timing-flanges 122, 123 but which, when said timing-lever comes into operative angular position, is presented inside the path of the timing-flanges 122, 123. The angular interval during which the timing-flanges are passing the studs 124, 125 coincides substantially with that portion of a revolution of the cam-shaft 21 wherein the main-cam 53 can shift a pawl-lever 47, 48, 49 or 50, 51, 52 lengthwise of its rocking-shaft 36 or 37 against the thrust of the coiled-spring 40 or 41, a distance equivalent to one step in the rotation of the star-wheel 54 in the one direction or the other and, during such interval, the individual timing-flanges 122, 123 so co-operate with the respective studs 124, 125 as either, on the one hand, to prevent the timing-levers 115, 116 from leaving their inoperative position or, on the other hand, to prevent whichever of said timing-levers (if either) has been brought to operative position, from being accidentally withdrawn therefrom.

The release of the respective timing-levers 115, 116 of the automatic mechanism (only one of which can be brought into operation at a time) is effected through the medium of a longitudinally movable "releasing-link" 126, extending transversely of both locking-levers 105, 106 and which has a pin-and-slot or equivalent engagement with the respective locking-levers. As illustrated the releasing link 126, passes through, and is doubly shouldered at 127, 128 to engage projections 129, 130 on the respective locking levers. According, therefore, as the releasing-link 126 is moved in the one direction or the other from a mid or neutral position, the one or the other locking-lever 105 or 106, depending on which shoulder 127 or 128 is caused to bear thereagainst, will be disengaged from the hub of the corresponding timing-lever 115 or 116 and will thus permit the corresponding gear-changing operation to take place, the other locking-lever being held, meanwhile by the action of the spring 109 against any tendency to be displaced.

The releasing link 126 is adapted to be moved in the one direction or the other at will, for which purpose it is attached to one end, by means of a suitable slot connection 133, with one end of an arm 134, pivoted as at 135 to the casing 25 of the gear-box, the other end 136 of said arm being adapted to engage a slot 137 formed in a quadrant 138 fast upon a manually rotatable spindle 139, extending upwardly through the floor indicated as 140ª of the vehicle and terminating in convenient proximity to the head of the steering column. According, therefore, as the spindle 139 is rotated in the one direction or the other, the arm 134, 136 will be rocked to displace the releasing-link 126 in a corresponding direction, with the result that the locking-lever 105 or 106 will be disengaged from its timing-lever 115 or 116 to permit the corresponding change of gear to take place. Sleeved upon the manually rotatable spindle 139 is a hollow-shaft 140 fast upon the outer end of which is a control disc 141 over which a hand-lever or a serrated knob 142, fast upon the outer end of the spindle 139, is movable.

Fast upon the inner end of the hollow-shaft 140 and in proximity to the quadrant 130 is a bevel gear-wheel 143 adapted to mesh with a second bevel-gear-wheel 144 fast upon the rear-end of the star-wheel shaft 55, so that when the hand-lever 142 has been moved to rotate the spindle 139 in the one direction or the other, thereby causing the releasing-link 126 to be moved in a corresponding direction to release the one or the other locking-levers 105 or 106 and so bring about the desired change in gear, up or down, the resulting rotary movement automatically imparted to the star-wheel 54 star-wheel shaft 55 and selector-cams 64, 65 will be transmitted through the bevel gear-wheels 144 and 143 to the hollow shaft 140 and the second quadrant 141, which latter will thus be caused to return the hand-lever 142 to its normal position and thus afford an indication of the completion of the gear-changing operation to the driver of the vehicle and the gear-change which has been effected.

Two modifications of the hand-lever 142 are shown in Figures 7 and 8 respectively. In Figure 7 the hand-lever 142 is in the form of a spring blade 142ª furnished with a control handle 145 movable over, and normally locked to, by means of the pin 146 on the arm 147 of the hand-lever, one of a circular series of holes 148 formed in the second quadrant (or control disc) 141 fast on the upper end of the hollow shaft 140 surrounding the manually rotatable spindle 139, the number of holes 148, of course, corresponding with the available number of gear positions.

In the second modification, as shown in Figure 8, the hand-lever is in the form of a serrated knob 149 fixed to the upper end of the manually rotatable spindle 139 and provided with a spring-loaded plunger in the form of a ball 150 pressed outwardly from said knob by a spring 151 to interlock with any one of the series of holes 148 formed in the control disc 141. The knob 149 may be provided with a pointer 149ª so that a clearer indication of the gear in mesh is given.

If it is desired to effect a manual change of gear without bringing into actuation any of the automatic mechanism for the purpose, the hollow shaft 140 may be fitted with a hand-wheel 152 (or hand-lever), so that the hollow shaft and hence the bevel gear-wheels 143, 144 and the selector-cams 64, 65 may be rotated thereby effecting the operation of the selector-operator 77 or 78, the selector 81 or 82, and the slidable pinion 62 or 63 to produce the desired change in gear. When a change in gear is effected in this manner, it is necessary to release the star-wheel shaft 55 (and hence the selector-cams 64, 65) to be free to rotate, by withdrawing the locking-pin 97 engaging one of the circular series of holes 99 formed in the star-wheel 54 and for this purpose a Bowden wire connection is provided to withdraw the pin 97 against the thrust of the spring 100 before the hand-wheel 152 is rotated to effect a manual change in gear.

It is desirable, in cases where the drive is transmitted through a friction clutch, as is general in automobile practice, to arrange for the clutch to be disengaged before the actual commencement of a change in gear when it is effected automatically. This automatic disengagement of the clutch may be accomplished very readily by the apparatus of the present invention, for since both pawl-levers 47, 48, 49 and 50, 51, 52 are moved in the same direction by rotation of the main cam 53, such movement can be utilized to bring about the disengagement of the clutch. As referred to above, each pawl-lever is provided with an arm 49, 52 which, as soon as the pawl-lever begins to slide along its rocking-shaft 36, 37 to effect a change in gear against the thrust of the coiled spring 40, 41, engage with an arm 56, 57 formed on a hub 58, 59 splined on the clutch-control-shaft 60, and thus imparts an angular movement to said shaft.

The clutch-control-shaft 60 extends transversely of, but not in the same plane as, the rocking-shaft, projecting beyond the gear-box and has on its outer end an arm 153 to which is secured a link or chain 154 secured at its other end to one arm 155 of a bell-crank lever, the other arm 156 of which is secured to the moveable members 157 of the driving clutch. Thus the angular displacement of the one or the other rocking-shaft to effect a change in gear, up or down, actuates the clutch-control shaft to withdraw the clutch before the actual change in the apparatus commences.

It will be understood that the whole of the mechanism described, with the exception of the hand-lever (or serrated knob) for initiating an automatic change of gear and the hand-wheel (or hand-lever for effecting a change of gear manually, can be accommodated within a gear-box very little larger than those at present employed to house a set of speed change gearing of any of the well-known types.

The method shown for driving the cam-shaft is given by way of example only, it being understood that any convenient method may be employed (provided that the cam-shaft is rotating continually as long as the engine is running) and that different methods of drive may be necessary for different types of speed change mechanism.

I claim :—

1. Gear-changing mechanism for a vehicle comprising a plurality of cylindrical cams, a shaft therefor, a pair of pawl-levers, each mounted on a rocking-shaft, arms on said pawl-levers a main-cam fast on a cam-shaft driven continuously by the engine, a star-wheel fast on the shaft on which said cylindrical cams are mounted, means for rocking the one or the other of said pawl-levers firstly to cause one of said arms thereon to engage between adjacent teeth of said star-wheel and secondly to cause a second of said arms thereon to engage the face of said main cam to be slidden a distance corresponding with the pitch of the teeth on said star-wheel along said rocking shaft to impart a rotary motion to said star-wheel equivalent to the angular pitch of said star-wheel.

2. Gear-changing mechanism for a vehicle, comprising a plurality of cylindrical cams, a shaft, a pair of pawl-levers each mounted on a rocking-shaft, three arms formed on said pawl-levers, a main-cam fast on a cam-shaft driven continuously by the engine, a star-wheel fast on the shaft on which are mounted said cylindrical cams, a clutch control shaft, an arm on said clutch-control shaft, means for rocking the one or the other of said pawl-levers so that, when the one or the other of said pawl-levers is rocked, the first engages the face of said main-cam, the second engages between two adjacent teeth on the star-wheel so that the sliding movement imparted to the pawl-lever by the engagement of the first arm with the main cam imparts a rotational movement to said star-wheel and the third arm engages said arm projecting from said clutch control shaft so that the clutch may be withdrawn automatically immediately before a change in gear is effected.

3. Gear changing mechanism for a vehicle as claimed in claim 2 wherein the pawl-levers are retained in their normal inoperative position and returned to such position after the one or the other has been displaced angularly as the result of a manual operation on the part of the driver of the vehicle.

4. Gear-changing mechanism for a vehicle comprising a pair of pawl-levers each mounted on a rocking-shaft, means for rocking the one or the other of said pawl-levers, a star wheel, means for locking said star-wheel positively against angular displacement, comprising a series of circumferential holes in said star-wheel, a pin engaging one of said series of holes, an arm projecting from a hub on each of said rocking-shafts, shoulders on said pin adapted to be engaged by each of said arms from opposite sides, said pin being adapted to be withdrawn against the thrust of a spring on the manual initiation of an automatic change in gear.

5. Gear-changing mechanism for a vehicle as claimed in claim 1, wherein the star-wheel is locked against accidental angular displacement by means of a spring-pressed jumper engaging between two adjacent teeth on said star-wheel.

6. Gear-changing mechanism for a vehicle comprising a pair of pawl-levers each mounted on a rocking-shaft, a "releasing link" a pivoted lever a quadrant fast on a manually rotatable spindle extending upwardly through the floor of the vehicle and terminating in proximity to the head of the steering column, a slot formed in said quadrant, the one arm of said pivoted lever engaging said releasing link and the other arm engaging said slot formed in said quadrant, actuation of said quadrant in the one direction or the other effecting a corresponding movement of said releasing-link which in turn rocks the one or the other pawl-lever to effect an automatic change in gear.

7. Gear-changing mechanism for a vehicle as claimed in claim 6, comprising a star-wheel a shaft therefor, a manually rotatable spindle on the lower end of which is mounted said slotted quadrant, a hollow shaft sleeved upon said manually rotatable spindle, a second quadrant (control disc) fast on the upper end of said hollow shaft, a hand lever fast upon the outer end of said manually rotatable spindle movable over said second quadrant, a bevel gear-wheel on the other end of said hollow shaft and in proximity to the slotted quadrant fast on the inner end of said manually rotatable spindle, a second bevel gear-wheel fast on said star-wheel shaft and in mesh with said first gear-wheel so that when a change in gear is effected (i. e. by rotation of said star-wheel shaft) the hollow shaft and hence the second quadrant, (control disc) will be forced to return the hand-lever or the like to its normal position with respect to the second quadrant and thereby afford an indication of the completion of the gear-changing operation and the change in gear which has been effected.

RICHARD MATTHEWS RUCK.